(12) United States Patent
Brown, Jr. et al.

(10) Patent No.: US 6,363,242 B1
(45) Date of Patent: Mar. 26, 2002

(54) IDENTIFYING ALTERNATIVE SERVICE OPTIONS

(75) Inventors: Phillip Dale Brown, Jr., Atlanta, GA (US); Yuen-Yin L. Koo, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/228,227

(22) Filed: Jan. 11, 1999

(51) Int. Cl.[7] .................................................. H04B 1/00
(52) U.S. Cl. ........................................ 455/70; 455/418
(58) Field of Search .......................... 455/70, 422, 414, 455/418, 419; 370/335

(56) References Cited

U.S. PATENT DOCUMENTS

| | | | | |
|---|---|---|---|---|
| 5,638,412 A | * | 6/1997 | Blakeney, II et al. | 375/377 |
| 6,134,433 A | * | 6/1997 | Joong et al. | 455/417 |
| 5,963,548 A | * | 10/1999 | Virtanen | 370/335 |
| 6,208,634 B1 | * | 3/2001 | Boulos et al. | 370/342 |
| 6,223,028 B1 | * | 4/2001 | Chang et al. | 455/419 |

FOREIGN PATENT DOCUMENTS

WO    WO 96/42174    * 12/1996

* cited by examiner

*Primary Examiner*—Dwayne Bost
*Assistant Examiner*—Erika Gary
(74) *Attorney, Agent, or Firm*—Christopher N. Malvone

(57) ABSTRACT

Wireless service option number assignments are divided into related groups. One group comprises voice service options: #1 (TIA/EIA-96-C "basic" 8k), #3 (IS-127 EVRC 8k), and #17 (IS-733 13k) which refer to different voice rates. Other groups may include data services; however, several sub-groupings are possible, and may be used to keep the size of each group at a manageable level. The TIA/EIA-96-C is hereby incorporated by reference. Definitions for each related group of service options (i.e., bitmap) would be maintained in a standard such as TSB58. The TSB58 standard is hereby incorporated by reference.

3 Claims, 1 Drawing Sheet

IDENTIFYING ALTERNATIVE SERVICE OPTIONS

BACKGROUND OF THE INVENTION

1. Field of the Invention

The present invention relates to wireless telecommunications, more particularly, identifying alternative service options.

2. Description of the Prior Art

The mechanism defined in IS-95B (the IS-95B Telecommunications Standard is hereby incorporated by reference) to allow the mobile station (MS) to specify up to seven alternate service options in the Origination and Page Response messages to the Base Station (BS). This mechanism suffers from time-consuming service negotiation request/response cycles in the event that the initial service option proposed by the MS was unacceptable to the BS.

This mechanism is potentially wasteful of bits on the Access Channel. Specifically, the current technique devotes 3 bits to NUM_ALT_SO (the number, from 0 to 7, of alternative service options the MS is proposing) in Origination and Page Response, plus an additional NUM_ALT_SO×16 bits for the list of service option numbers. Specifying even a single alternative service option therefore requires 19 bits, and specifying more than one becomes unattractive due to the overhead involved.

Despite the fact the service option is a 16-bit number, fewer than two dozen unique service options have been defined to date (per PN-4158/TSB58-A). Although that number is expected to grow in the future, it is hard to imagine enough new service options will be defined as to outgrow a bitmap mechanism that is to be proposed and is sufficiently robust.

SUMMARY OF THE INVENTION

To impose order on the existing arbitrary service option number assignments, the present invention divides them into related groups. One group comprises voice service options: #1 (TIA/EIA-96-C "basic" 8k), #3 (IS-127 EVRC 8k), and #17 (IS-733 13k) which refer to different voice encoding rates. Other groups may include data services; however, several subgroupings are possible, and may be used to keep the size of each group at a manageable level. The TIA/EIA-96-C is hereby incorporated by reference.

Definitions for each related group of service options (i.e., bitmap) would be maintained in a standard such as TSB58. The TSB58 standard is hereby incorporated by reference.

DETAILED DESCRIPTION OF THE INVENTION

Figure 1:
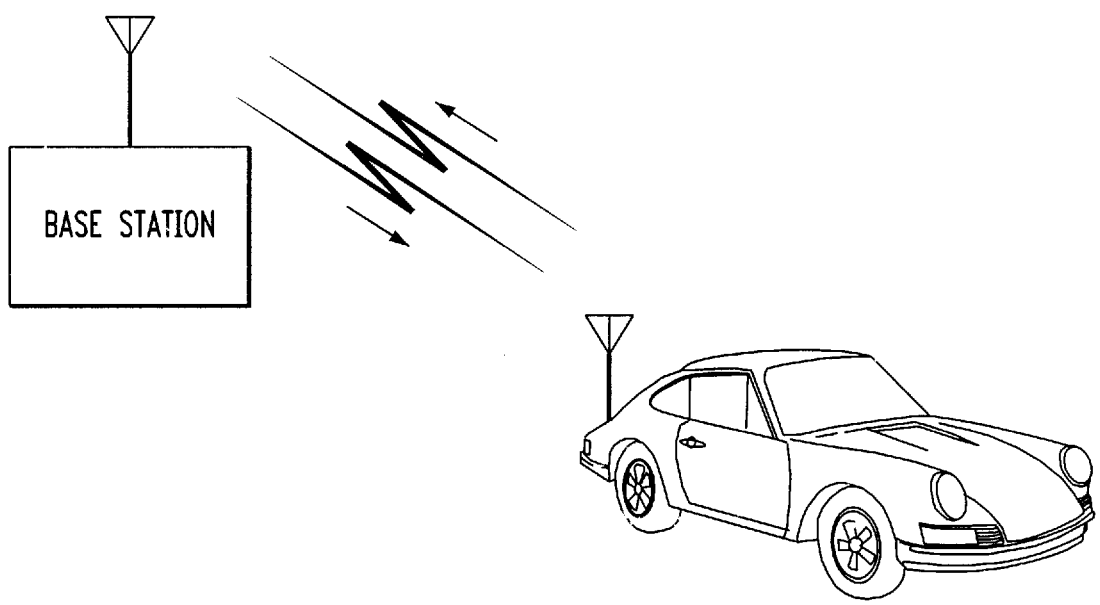
FIG. 1 illustrates a base station and a mobile station.

When the base station supports alternate service options specified by the mobile station. (i.e., MAX_NUM_ALT_SO, in the Extended System Parameter Message, is greater than 0) the CDMA2000 (the Telecommunications Industry Association (TIA) CDMA2000 (MOB_P_REV=6) standard is hereby incorporated by reference) mobile stations will indicate alternative service options mapped into the same (or a similar) group. Each group will consist of up to eight related service options—in other words, each bitmap will occupy 8 bits The MS will set each bit that corresponds to an acceptable alternative service option. A 4 bit field in the 8 bits field will define the number of the service groups which contains the acceptable alternate service options of the mobile station. The structure of this 4-bit field varies based on whether or not a new Origination Message/Page Response Message is used. When this field is added to the existing message, it consists of two parts, 3 bits NUM_ALT_SO and a 1-bit EXT_SO_GROUP; and the group number is calculated as 8* EXT_SO_GROUP+NUM_ALT_SO. The values '0000' and '1111' are reserved, and '1000' may also be reserved, leaving 13 possible groups (for a total of 8×13=104 possible service options supported using this technique). Note that this approach will allow the MS to propose as many as eight alternative service options, which is consistent with the seven currently defined. The value '1111' is an escape that could be used for future expansion if the total number of supported service options or service option groups proves to be inadequate. The value '1000' is reserved, so that the 3-bit field NUM_ALT_SO in the Origination Message or the Page Response Message can be used to determine whether or not the mobile station accepts any alternate service option from both the CDMA2000 and IS-95B base station.

Origination Message

When the mobile station generates L3_SDU for an Origination Message, it shall use the following variable-length format:

| Field | Length (bits) |
| --- | --- |
| MOB_TERM | 1 |
| SLOT_CYCLE_INDEX | 3 |
| MOB_P_REV | 8 |
| SCM | 8 |
| REQUEST_MODE | 3 |
| SPECIAL_SERVICE | 1 |
| SERVICE_OPTION | 0 or 16 |
| PM | 1 |
| DIGIT_MODE | 1 |
| NUMBER_TYPE | 0 or 3 |
| NUMBER_PLAN | 0 or 4 |
| MORE_FIELDS | 1 |
| NUM_FIELDS | 8 |
| NUM_FIELDS occurrences of the following field: | |
| CHARi | 4 or 8 |
| NAR_AN_CAP | 1 |
| PACA_REORIG | 1 |
| RETURN_CAUSE | 4 |
| MORE_RECORDS | 1 |
| ENCRYPTION_SUPPORTED | 0 or 4 |
| PACA_SUPPORTED | 1 |
| NUM_ALT_SO | 3 |

If NUM_ALT_SO is not zero and MOB_P_REV_IN_USE is less than 6, the additional fields shall be:

| NUM_ALT_SO occurrences of the following field: | |
| --- | --- |
| ALT_SO | 16 |

If NUM_ALT_SO is not zero and MOB_P_REV_IN_USE is greater than or equal to 6, the additional fields shall be:

| MBS_SO_GROUP | 1 |
| --- | --- |
| ALT_SO_GROUP | 8 |

[ . . . ]

NUM_ALT_SO—Number of alternative service options.

The mobile station shall set this field to the number of alternative service options it supports other than the one specified in the SERVICE_OPTION field. The mobile station shall set this field to a value less than or equal to MAX_NUM_ALT_SO$_S$.

If the P_REV_IN_USE$_S$ is equal to or greater than 6, and the mobile station supports at leaset one alternate Service Option and MAX_NUM_ALT_SO$_S$ is greater than '000', the mobile station shall set this field to the 3 LSB bits of the number of the SO group, defined in TSB58A, containing the alternate service option supported by the mobile station; otherwise, the mobile station shall set this field to zero.

If this field is not zero, the SO group number is equal to

8×MSB_SO_GROUP+NUM_ALT_SO_

The value '1000' will not be used and '1111' is reserved.

MSB_SO_GROUP_—The most significant bit of alternate SO group

If mobile station shall set this field to the most singificant bit of the number of the SO group containing alternative SO supported by the mobile station. For example, if the SO group number is 9 or greater, this field is set to 1.

This field shall be omitted, if ALT_NUM_SO field is '000'

ALT_SO_GROUP_—Alternative Service Option Group.

If NUM_ALT_SO is equal to '000' or P_REV_IN_USE$_S$ is less than 6, the mobile station shall omit this field; otherwise, the mobile station shall set each bit in the specified Service Option Group that corresponds to an alternative service option supported by the mobile station.

ALT_SO—Alternative service option.

If P_REV_IN_USE$_S$ is less than 6, the mobile station shall include NUM_ALT_SO occurrences of this field. The mobile station shall set this field to the value specified in TSB58-A, corresponding to the alternative service option supported by the mobile station.

Page Response Message

When the mobile station generates L3_SDU for a Page Response Message, it shall use the following variable-length format:

| Field | Length (bits) |
| --- | --- |
| MOB_TERM | 1 |
| SLOT_CYCLE_INDEX | 3 |
| MOB_P_REV | 8 |
| SCM | 8 |
| REQUEST_MODE | 3 |
| SERVICE_OPTION | 16 |
| PM | 1 |
| NAR_AN_CAP | 1 |
| ENCRYPTION_SUPPORTED | 0 or 4 |
| NUM_ALT_SO | 3 |

If NUM_ALT_SO is not zero and P_REV_IN_USE$_S$ is less than 6, the additional fields shall be:

| NUM_ALT_SO occurrences of the following field: | |
| --- | --- |
| ALT_SO | 16 |

If NUM_ALT_SO is not zero and P_REV_IN_USE$_S$ is greater than or equal to 6, the additional fields shall be:

| | |
| --- | --- |
| MSB_SO_GROUP | 1 |
| ALT_SO GROUP | 8 |

[ . . . ]

NUM_ALT_SO—Number of alternative service options.

If the P_REV_IN_USE$_S$ is less than 6, the mobile station shall set this field to the number of alternative service options it supports other than the one specified in the SERVICE_OPTION field. The mobile station shall set this field to a value less than or equal to MAX_NUM_ALT_SO$_S$.

If the P_REV_IN_USE$_S$ is equal to or greater than 6, and the mobile station supports at least one alternate Service Option and MAX_NUM_ALT_SO$_S$ is greater than '000', the mobile station shall set this field to the 3 LSB bits of the number of the SO group, defined in TSB58A, containing the alternate service option supported by the mobile station; otherwise, the mobile station shall set this field to zero.

If this field is not zero, the SO group number is equal to

8×MSB_SO_GROUP+NUM_ALT_SO_

The SO group number '1000' will not be used and '1111' is reserved.

MSB_SO_GROUP_—The most significant bit of alternate SO group

If mobile station shall set this field to the most singificant bit of the number of the SO group containing alternative SO supported by the mobile station. For example, if the SO group number is 9 or greater, this field is set to 1.

This field shall be omitted, if ALT_NUM_SO field is '000'

ALT_SO_GROUP_—Alternative Service Option Group.

If NUM_ALT_SO is equal to '000' or P_REV_IN_USE$_S$ is less than 6, the mobile station shall omit this field; otherwise, the mobile station shall set each bit in the specified Service Option Group that corresponds to an alternative service option supported by the mobile station.

ALT_SO—Alternative service option.

If the P_REV_IN_USE$_S$ is less than 6 and NUM_ALT_SO is greater than 0, the mobile station shall include NUM_ALT_SO occurrences of this field. The mobile station shall set this field to the value specified in TSB58-A, corresponding to the alternative service option supported by the mobile.

Extended System Parameters Message

When the base station generates L3_SDU for an Extended System Parameters Message, it shall use the following variable-length format:

| Field | Length (bits) |
| --- | --- |
| PILOT_PN | 9 |
| CONFIG_MSG_SEQ | 6 |
| DELETE_FOR_TMSI | 1 |
| USE_TMSI | 1 |
| PREF_MSID_TYPE | 2 |
| MCC | 10 |
| IMSI_11_12 | 7 |
| TMSI_ZONE_LEN | 4 |
| TMSI_ZONE | 8 ? TMSI_ZONE_LEN |
| BCAST_INDEX | 3 |
| IMSI_T_SUPPORTED | 1 |
| P_REV | 8 |

-continued

| Field | Length (bits) |
|---|---|
| MIN_P_REV | 8 |
| SOFT_SLOPE | 6 |
| ADD_INTERCEPT | 6 |
| DROP_INTERCEPT | 6 |
| PACKET_ZONE_ID | 8 |
| MAX_NUM_ALT_SO | 3 |
| RESELECT_INCLUDED | 1 |
| EC_THRESH | 0 or 5 |
| EC_IO_THRESH | 0 or 5 |
| PILOT_REPORT | 1 |
| NGHBR_SET_ENTRY_INFO | 1 |
| ACC_ENT_HO_ORDER | 0 or 1 |
| NGHBR_SET_ACCESS_INFO | 1 |
| ACCESS_HO | 0 or 1 |
| ACCESS_HO_MSG_RSP | 0 or 1 |
| ACCESS_PROBE_HO | 0 or 1 |
| ACC_HO_LIST_UPD | 0 or 1 |
| ACC_PROBE_HO_OTHER_MSG | 0 or 1 |
| MAX_NUM_PROBE_HO | 0 or 3 |
| NGHBR_SET_SIZE | 0 or 6 |

If NGHBR_SET_ENTRY_INFO=1, NGHBR_SET_SIZE occurrences of the following field; otherwise, no occurrence of the following field:

| ACCESS_ENTRY_HO | 1 |
|---|---|

If NGHBR_SET_ACCESS_INFO=1, NGHBR_SET_SIZE occurrences of the following field; otherwise, no occurrence of the following field:

| ACCESS_HO_ALLOWED | 1 |
|---|---|

PILOT_PN—Pilot PN sequence offset index.

The base station shall set this field to the pilot PN sequence offset for this base station, in units of 64 PN chips.

MAX_NUM_ALT_SO—Maximum number of alternative service options.

The base station shall set this field to the maximum number of alternative service option numbers that the mobile station MOB P_REV less than 6 is allowed to include in the Origination Message or the Page Response Message. For mobile station with MOB_P_REV greater than or equal to 6, a non-zero value indicates that the base station allows the mobile station to request alternate service options.

The invention claims is:

1. A method for interpreting an alternative service option communicated from a mobile station in a telecommunication system, comprising the steps of:

receiving a first message field specifying at least one communications standard revision supported by the mobile station;

if a latest communications standard revision specified in the first message field is less than a predetermined communications standard revision, using a second message field to determine a number of service option specification fields to receive;

if the latest communications standard revision specified in the first message field is greater than or equal to the predetermined communications standard revision, using at least the second message field to identify one of a plurality of service option groups as a identified service option group.

2. The method of claim 1, wherein if the latest communications standard revision specified in the first message field is greater than or equal to the predetermined communications standard revision, using a third message field to identify at least one service option in the identified service option group.

3. The method of claim 2, wherein if the latest communications standard revision specified in the first message field is greater than or equal to the predetermined communications standard revision using the second and a forth message field to identify one of a plurality of service option groups as a identified service option group.

* * * * *